Oct. 24, 1939.  M. D. STONE ET AL  2,177,356
COMPOSITE METAL STRIP AND METHOD AND APPARATUS FOR TRIMMING IT
Filed July 20, 1937  2 Sheets-Sheet 1
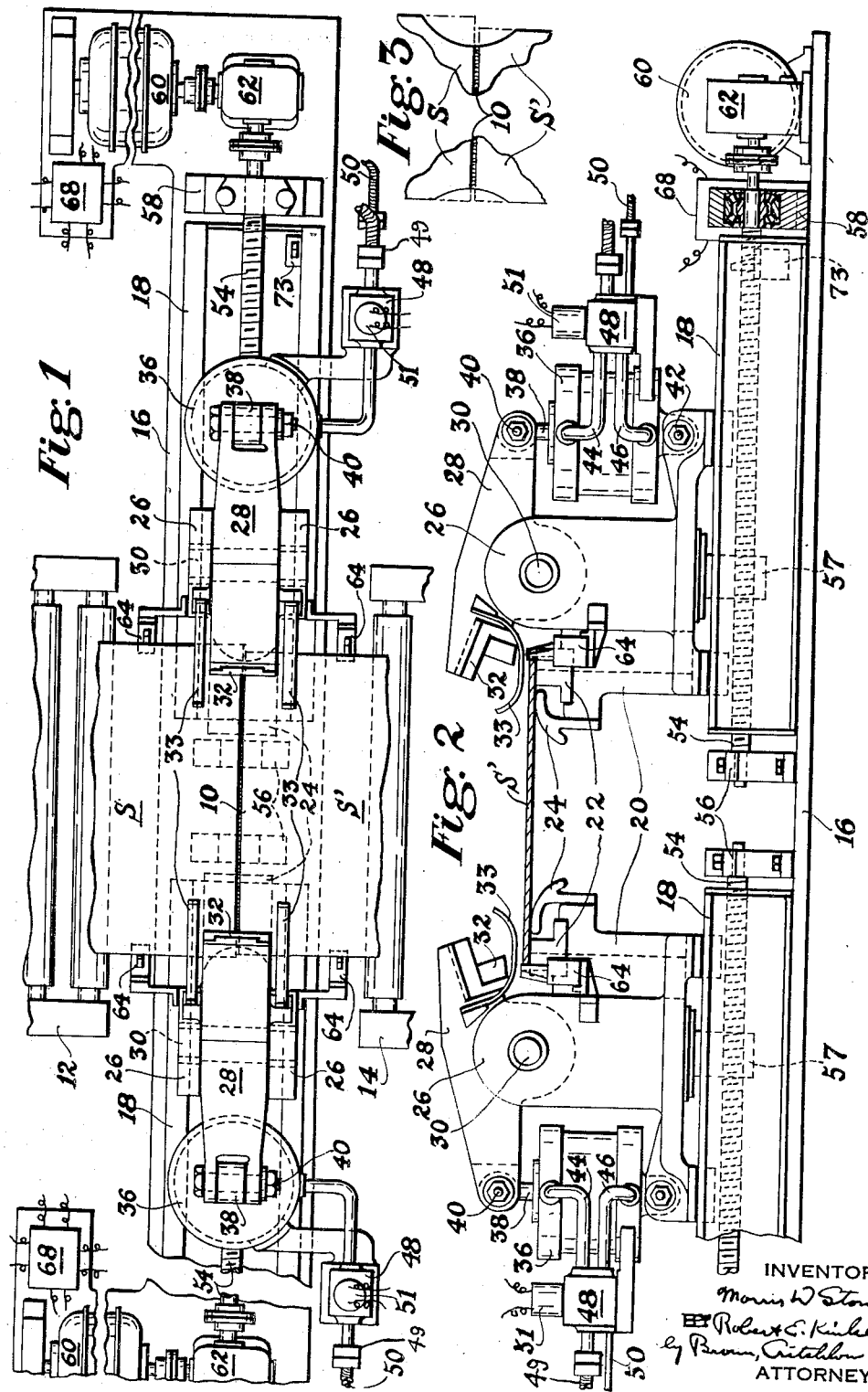
INVENTOR
Morris D. Stone, and
Robert E. Kinkead
By Brown, Critchlow & Flick
ATTORNEYS Oct. 24, 1939.  M. D. STONE ET AL  2,177,356
COMPOSITE METAL STRIP AND METHOD AND APPARATUS FOR TRIMMING IT
Filed July 20, 1937  2 Sheets-Sheet 2
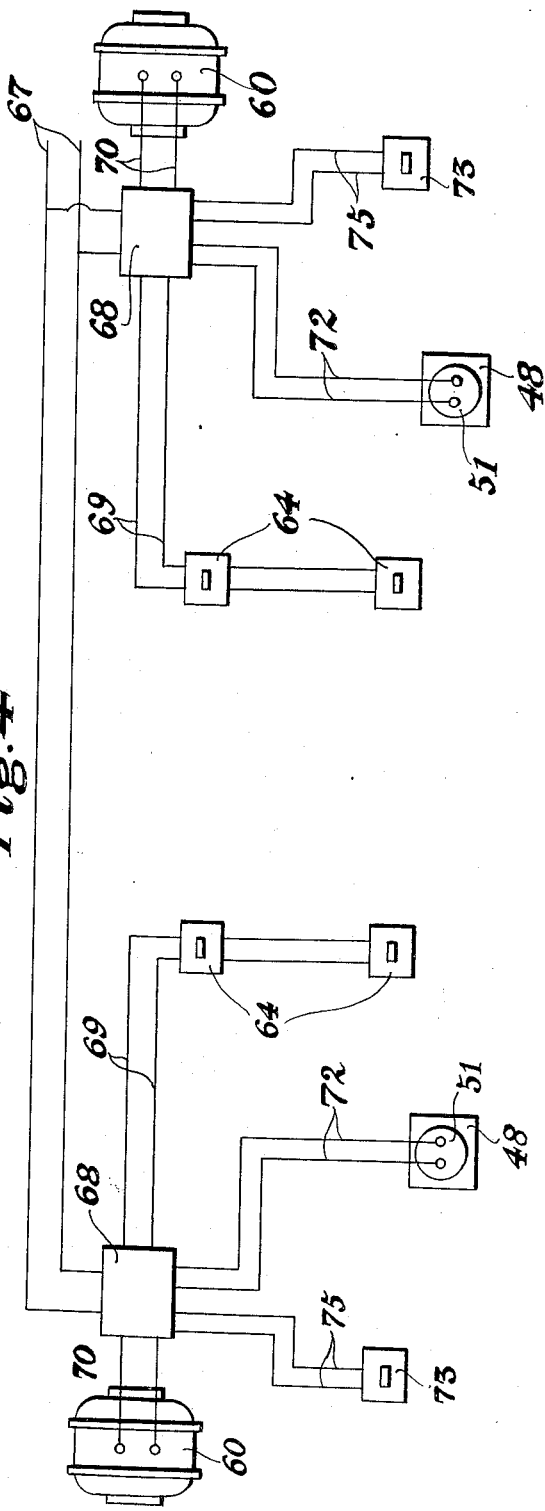
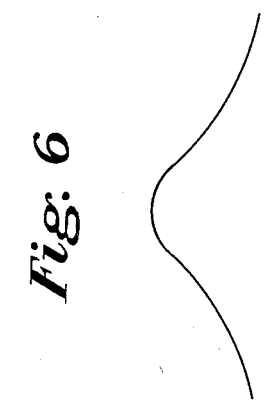
INVENTORS
Morris D. Stone, and
Robert E. Kinkead,
by Brown, Critchlow & Flick
ATTORNEYS Patented Oct. 24, 1939

2,177,356

UNITED STATES PATENT OFFICE 2,177,356

COMPOSITE METAL STRIP AND METHOD AND APPARATUS FOR TRIMMING IT

Morris D. Stone, Pittsburgh, Pa., and Robert Emerson Kinkead, Cleveland, Ohio; said Stone assignor to United Engineering & Foundry Company, Pittsburgh, Pa., a corporation of Pennsylvania Application July 20, 1937, Serial No. 154,544

18 Claims. (Cl. 29—18)

This invention relates to welding metal strip end to end and more particularly is concerned with methods and apparatus for trimming the overhanging corners produced when metal strips of different widths or in improper alignment are welded end to end and the resulting composite strip.

Heretofore metal strip has been welded together end to end with butt joints by first shearing the ends of the strips to prepare them for welding, aligning the strip ends together and then butt welding the strips by any of several appropriate welding processes. When metal strip is welded together in this manner and is not of the same width the wider strip end will extend laterally beyond the narrower strip end to form what is herein termed overhanging corners. Similar overhanging corners are produced by slight but requisite production errors in alignment even though the strips are substantially of the same width. These overhanging corners of the metal strip are objectionable in the subsequent handling of the strip as they are sharp and extend laterally of the strip so that they strike aligning or other similar means and are very apt to be bent back onto the body of the strip. If the strip is rolled subsequent to welding, the bent-back corners result in roll marking and are therefore highly objectionable.

Moreover, we have found that it is difficult if not impossible to weld completely to the edge of the strips even when of the same width and in proper alignment so that the ends of the weld are poor and in certain instances produce notch effects tending to concentrate stresses so that if the composite strip produced by welding is rolled under tension the weld may fail from the notched end portions thereof.

It is the general object of our invention to avoid and overcome the foregoing and other difficulties attending the welding of metal strip end to end by the provision of methods and apparatus for rapidly and effectively removing the overhanging corners and/or end portions of the weld formed when metal strips in slight misalignment or of different width are welded end to end.

Another object of our invention is to provide substantially automatic apparatus which is relatively inexpensive and easily operated to efficiently and substantially automatically shear the overhanging corners from metal strip adjacent the line of weld joining the strips together.

Another object of our invention is the provision of a novel method for trimming the ends of a line of weld joining metal strip ends together whereby any overhanging corners of the strips are removed and so that the strip is adapted to subsequent rolling operations.

Another object of our invention is to provide an improved composite strip formed of individual lengths of strip butt welded end to end.

In the accompanying drawings Fig. 1 is a plan view of one embodiment of apparatus constructed in accordance with our invention; Fig. 2 is a side elevation of the apparatus shown in Fig. 1; Fig. 3 is an enlarged plan view of the line of weld of a composite strip produced by joining two metal strips end to end which has been operated on in accordance with the principles of our invention; Fig. 4 is a simplified wiring diagram of the automatic control for the apparatus; and Figs. 5 and 6 are schematic representations of modified trimming die contours.

Referring particularly to the drawings, the letter S indicates the end of a length of metal strip which has been welded in any desired manner and at a line of weld 10 to the end S' of another length of strip. The strips S and S' are fed to and from the apparatus hereinafter described in any suitable manner, as by the provision of conveyors 12 and 14. Positioned between the conveyors 12 and 14 is a base 16 having beds 18 secured thereon in spaced relation. Slidably mounted on the beds 18 are carriages 20 each of which has a trimming die 22 thereon and adapted to support the strip. Guides 24 may be provided adjacent the dies 22 to assist in guiding the strips into proper relation on the dies 22. Each carriage 20 is formed with upwardly extending spaced flanges 26 which receive a rocker arm 28 pivotally mounted upon a pin 30 carried between the flanges 26. Each rocker arm 28 carries a punch 32 which cooperates with its associated die 22. As best seen in Fig. 1 of the drawings, the die 22 and the cooperating punch 32 have a curved cutting edge (shown in dotted lines) so that a concavely arcuate cut is made upon the strips by them as hereinafter described. Spring arms 33 carried on the ends of each rocker 28 adjacent the punch 32 but spaced therefrom as best evident in Fig. 1 of the drawings are provided to engage with the ends S and S' of the strips during the initial trimming movement of the rocker 28 so that during the actual trimming operation the strip ends are firmly held.

Suitable means are provided to move each rocker 28 and in the embodiment of our invention illustrated these means comprise a fluid pressure motor 36 having a piston rod 38 pivotally secured, as at 40, to the end of the rocker 28 remote from the punch 32. The lower end of the fluid pressure motor 36 is pivotally secured as at 42 to the carriage 20. Fluid under pressure is supplied to the motor 36 by pipes 44 and 46 which are connected through a valve 48 to a supply pipe 50; pipe 49 is the exhaust line for the expanded fluid. The valve 48 is adapted for automatic operation, and to this end may include an electric solenoid 51 for operating the valve as hereinafter described.

Each carriage 20 is mounted for movement along its respective bed 18 so as to bring the punch 32 into working relation with the side or edge of the welded strips. Preferably this is accomplished by the provision of a threaded shaft 54 received at its ends in bearings 56 and 58 and adapted to be driven by a motor 60 through a reduction gear box 62. A nut 57 secured to the bottom of each carriage 20 surrounds the threaded shaft 54 and provides for movement of the carriage along the bed 18 when the shaft 54 is rotated, as will be understood. Associated with each carriage 20 and mounted adjacent the sides of the die 22 are limit switches 64 for controlling the automatic operation of the motors 60. One of the limit switches is adapted to engage with one side of strips S and S' and the other limit switch is adapted to engage with the other side of the strips, and the motor is not stopped until both limit switches are engaged. More particularly, as shown in Fig. 4, electric current leads 67 from a source of electric power extend to control boxes 68 connected by leads 69 to the limit switches 64. Leads 70 and 72 extend, respectively, to the motors 60 and to the solenoids 51 controlling valves 48.

Each control box 68 includes a time delay relay adapted upon the closing of both associated limit switches 64 to shut off the current to the associated motor 60 which is preferably magnetically and/or mechanically braked to immediately stop forward movement of the carriage 20. Operation of the time delay relay, as just described, likewise operates the associated solenoid 51 to cause the operation of the valve 48 and the rocking of the associated punch to perform the desired side trimming of the strip. After the necessary time delay for the operation of the punch the relay reverses the current drive to the associated motor which returns the carriage 20 to its original position where it is preferably automatically stopped as by the provision of a limit switch 73 on the associated bed 18. The limit switch 73 is electrically connected to the associated control box 68 by leads 75. Since with the foregoing description the ordinary electrician can provide a complete electric circuit for the parts and because any circuit provided is only one of numerous electrical interlocking circuits which could be provided, we have herein described and illustrated the circuit diagrammatically.

In the operation of the improved apparatus of our invention as just described and in the practice of our novel method we contemplate butt welding the ends S and S' of the strips together with any suitable type of apparatus, as, for example, electric arc, gas or by flash welding. After welding the line of weld 10 is moved along the conveyors 12 and 14 so as to position the line of weld between the carriages 20 which are in their retracted position, i. e., at a position back toward the motors 60 on the beds 18. We likewise contemplate allowing the strip ends to remain stationary after welding them together and arranging the trimming apparatus herein described at the welding station so that once the welding mechanism is swung out of position the punch for trimming the overhanging corners of the strip ends can be operated.

In any event, once the strips have been welded end to end and are positioned relative to the trimming means the operator starts motors 60 through control boxes 68 to move the carriages 20 towards each other and towards the strip positioned therebetween. If the strip has sagged slightly between the conveyors 12 and 14 it engages with the sloping guides 24 which carry the lateral edges of the strip up and position them on the dies 22. As the carriages 20 bring the dies 22 and punches 32 into working relation with the sides of the strip at the line of weld, the motors 60 are automatically stopped through the limit switches 64 engaging with the sides of the strips as above described.

The automatic stopping of the carriages 20 as effected by the limit switches 64 likewise effects the opening of the valves 48 which allows fluid under pressure to flow through the pipes 50 and 46 to operate fluid pressure motors 36 and thereby forcibly move the rockers 28. The tilting of the rockers 28 first brings the spring arms 33 into engagement with the surfaces of the strip ends to hold them tightly upon the dies 22. Continued working movement of each rocker 28 causes the punch 32 carried thereby to engage with the strip and to trim out a small arcuate portion from the side or lateral edge of the strip at the ends of the line of weld 10. As above stated, the line of cut on the strip is curved concavely so that, as best seen in Fig. 3, overhanging corners at the ends of the strip adjacent the line of weld are entirely removed and the strip can be readily passed to additional rolling operations without the danger that any overhanging corners of the strip will be bent back upon themselves with the attendant danger of roll marking. Moreover, with the trimmings are removed the poorly welded portions at the ends of the line of weld 10 and also the stress concentrations or notch stresses at the line of weld. Preferably the greatest lateral depth of the cut is at the line of the weld although certain of the advantages of our invention are retained even though this is not so. We likewise contemplate the use of other than an arcuate die and punch as for example trimming means adapted to trim out a shape bounded by an ascending and a descending curve connected by a straight portion (Fig. 5), or by an arc (Fig. 6). But any differently shaped trimming tool which makes a cut the sides of which diverge towards the edge of the strip smoothly and without sharp corners, will also do, hence our invention can be practiced with an infinite number of different trimming dies.

After the trimming operation the valves 48 are automatically reversed as above described to return the rockers 28 to their full-line position shown in Fig. 2. Once the valves 48 are returned to their original position the motors 60 are driven in the reverse direction to return each carriage 20 to its positions adjacent its driving motor 60 and the strip is free to pass to any subsequent operation.

From the foregoing it will be recognized that the objects of our invention have been achieved by the provision of substantially automatic methods and apparatus for rapidly and efficiently trimming the overhanging corners from composite metal strip produced by butt welding lengths of metal strip having slight misalignment and/or of different widths together end to end. The apparatus is relatively inexpensive to construct, maintain and operate and is substantially automatic. The improved method particularly adapts itself to productive operations and eliminates all danger of overhanging corners in metal strip butt welded end to end. Likewise, the end portions of the weld are removed to eliminate notch effects and the resulting composite strip is better adapted to subsequent handling and particularly rolling operations.

While in accordance with the patent statutes one embodiment of our invention has been particularly illustrated and described, it should be appreciated that our invention is not limited thereto or thereby but is defined in the appended claims.

We claim:

1. Apparatus for trimming the overhanging corners of metal strip of different widths and/or misalignment butt welded end to end which comprises a base, means for supporting the strip adjacent the base, dies mounted for movement to and from the sides of the strips, means on the dies for engaging and supporting the strip, punches on said dies adapted to make a substantially concave cut in each side of the strip at the line of weld to trim any overhanging corners from the strip and to remove the ends of the line of weld, means for moving the dies into working relation with the strip, means for stopping the last-named means with the dies in the proper working position, means for operating the punches, means for instituting the operation of the punches when in the proper position, and means for returning the dies to a position remote from the strip.

2. Apparatus for trimming the overhanging corners of metal strip of different widths and/or misalignment butt welded end to end which comprises a base, means for supporting the strip adjacent the base, dies mounted for movement to and from the sides of the strips, means on the dies for engaging and supporting the strip, punches on said dies adapted to make a substantially concave cut in each side of the strip at the line of weld to trim any overhanging corners from the strip and to remove the ends of the line of weld, means for moving the dies into working relation with the strip, means for stopping the last-named means with the dies in the proper working position, means for operating the punches, and means for instituting the operation of the punches when in the proper position.

3. Apparatus for trimming the overhanging corners of metal strip of different widths and/or misalignment butt welded end to end which comprises a base, means for supporting the strip adjacent the base, metal-working means mounted for movement to and from the sides of the strips and adapted to remove a substantially concave portion in each side of the strip at the line of weld to trim any overhanging corners from the strip, means for moving the metal-working means into working relation with the strip, means for operating the metal-working means, and means for returning the metal-working means to a position remote from the strip.

4. Apparatus for trimming the ends of the line of weld of metal strip butt welded end to end which comprises means for supporting the strip, means for clamping the strip, dies mounted for movement to and from the sides of the strips, punches on said dies adapted to make a cut in each side of the strip at the ends of the line of weld to trim any poorly welded portions therefrom, means for moving the dies into working relation with the strip, means engaging with the sides of both strip ends for stopping the last-named means with the dies in the proper position, means for operating the punches, means for instituting the operation of the punches when in the proper position, and automatic means for returning the dies to a position remote from the strip.

5. Apparatus for trimming the ends of the line of weld of metal strip butt welded end to end which comprises means for supporting the strip, dies mounted for movement to and from the sides of the strips, punches on said dies adapted to make a cut in each side of the strip at the ends of the line of weld to trim any poorly welded portions therefrom, means for moving the dies into working relation with the strip, means for stopping the last-named means with the dies in the proper position, and means for operating the punches.

6. In combination, a conveyor for supporting metal strip, carriages mounted at the sides of the strip and movable laterally to and from the strip, a die mounted on each carriage, a punch associated with each of the dies, means for moving the punches toward and from the dies to perform a trimming operation, means for moving the carriages laterally relative to the strip to bring the dies into working relation with the sides of the strip, means adapted to engage with the ends of both strips for automatically stopping the carriages with the dies in the proper position, means for automatically actuating the punches after the carriages have been stopped, and means for automatically returning the carriages to their original position after the trimming operation.

7. In combination, a conveyor for supporting metal strip, means for clamping the strip, carriages mounted at the sides of the strip and movable laterally to and from the strip, a die mounted on each carriage, a punch associated with each of the dies, means for moving the punches toward and from the dies to perform a substantially concave trimming operation on the sides of the strip, means for moving the carriages laterally relative to the strip to bring the dies into working relation with the sides of the strip, means for automatically stopping the carriages with the dies in the proper position, means for automatically actuating the punches after the carriages have been stopped, and means for automatically returning the carriages to their original position after the trimming operation.

8. In combination, a conveyor for supporting metal strip, carriages mounted at the sides of the strip and movable laterally to and from the strip, a die mounted on each carriage, a punch pivotally carried by each of the carriages, means for moving the punches toward and from the dies to make a cut having diverging boundaries towards the edge of the strip in the sides of the strip, means for moving the carriages laterally relative to the strip to bring the dies into working relation with the sides of the strip, means for stopping the carriages with the dies in the proper position, means for actuating the punches after the carriages have been stopped, and means for returning the carriages to their original position after the trimming operation.

9. In combination, means for supporting metal strip, a carriage mounted at the side of the strip and movable laterally to and from the strip, a die mounted on the carriage, a punch carried by the carriage means for moving the punch toward and from the die to perform a trimming operation on the side of the strip, means for moving the carriage laterally relative to the strip to bring the die into working relation with the side of the strip, means for automatically stopping the carriages with the die in the proper position, means for automatically actuating the punch after the carriage has been stopped, and means for automatically returning the carriage to its original position after the trimming operation.

10. In combination, means for supporting metal strip, carriages mounted at the sides of the strip and movable laterally to and from the strip, means mounted on each carriage for removing metal from the sides of the strip, means for moving the carriages laterally relative to the strip to bring the metal-removing means into working relation with the sides of the strip, means for stopping the carriages with the metal-removing means in the proper position, means for actuating the metal-removing means after the carriages have been stopped, and means for returning the carriages to their original position after the metal-removing operation.

11. That method of making composite metal strip which comprises butt welding together the ends of metal strips of different width and/or misalignment to form a composite strip, clamping the composite strip, simultaneously taking a substantially concave cut on each side of the composite strip at the ends of and including the line of weld with the greatest lateral depth of the cut being in the line of weld, and unclamping the strips.

12. That method of making composite metal strip which comprises butt welding together the ends of metal strips of different width and/or misalignment to form a composite strip, clamping the composite strip, simultaneously taking a substantially concave cut which gradually merges into a convex cut adjacent the extreme edges of the strip on each side of the composite strip at the ends of and including the line of weld, and unclamping the strips.

13. That method of trimming overhanging corners from the ends of metal strips of different width and/or slightly misaligned and welded together end to end which comprises taking a substantially concave cut on at least one side of the strip at the end of and including the line of weld with the greatest lateral depth of the cut being substantially in the line of weld.

14. A metal strip comprising a plurality of lengths of metal strip butt welded end to end and having portions of the individual strips removed adjacent and including the ends of the line of weld and leaving substantially arcuate, concave recesses, the portions removed including overhanging corners and the extreme ends of the line of weld.

15. A metal strip comprising a plurality of lengths of metal strip butt welded end to end and having a substantially concave recess adjacent an end of and including the line of weld, the recess having its greatest lateral depth at the line of weld.

16. A metal strip comprising a plurality of lengths of metal strip butt welded end to end and having a recess having diverging boundaries towards the edge of the strip adjacent an end of the line of weld, the recess serving to cut away part of the end of the line of weld to thereby overcome notch effect.

17. Apparatus for trimming the overhanging corners of metal strip of different widths and/or misalignment when butt welded together, comprising smoothly curved concave cutting means for supporting the strip ends, means for removing portions of the strip adjacent the ends of the line of weld to eliminate notch effects at the line of weld, means for laterally moving the strip removing means toward and from the ends of the line of weld, and means for individually operating the strip removing means when in proper position over the ends of the line of weld.

18. In an apparatus for trimming the overhanging corners from metal strip of different widths and/or misalignment when butt welded together, comprising smoothly curved cutting means for removing portions of the strip adjacent the ends of the line of weld to eliminate notch effects at the line of weld, said means being disposed for movement toward and from the ends of the line of weld, and means for operating the strip removing means when in proper position over the ends of the line of weld.

MORRIS D. STONE.
ROBERT EMERSON KINKEAD.